(12) United States Patent
Sui

(10) Patent No.: US 10,567,350 B2
(45) Date of Patent: Feb. 18, 2020

(54) VIRTUAL CARD DOWNLOADING METHOD, TERMINAL, AND INTERMEDIATE DEVICE

(71) Applicant: Huawei Technologies Co., Ltd., Shenzhen (CN)

(72) Inventor: Sanjun Sui, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 452 days.

(21) Appl. No.: 15/307,296

(22) PCT Filed: Apr. 28, 2014

(86) PCT No.: PCT/CN2014/076347
§ 371 (c)(1),
(2) Date: Oct. 27, 2016

(87) PCT Pub. No.: WO2015/164999
PCT Pub. Date: Nov. 5, 2015

(65) Prior Publication Data
US 2017/0048206 A1    Feb. 16, 2017

(51) Int. Cl.
*H04L 29/06* (2006.01)
*H04W 8/18* (2009.01)
*H04W 12/06* (2009.01)
*H04W 12/08* (2009.01)

(52) U.S. Cl.
CPC ...... *H04L 63/0428* (2013.01); *H04L 63/0281* (2013.01); *H04L 63/0876* (2013.01); *H04L 63/10* (2013.01); *H04W 8/18* (2013.01); *H04W 12/06* (2013.01); *H04W 12/08* (2013.01)

(58) Field of Classification Search
CPC ............. H04L 63/0428; H04L 63/0281; H04L 63/0876; H04L 63/10; H04W 8/18; H04W 8/24; H04W 8/205; H04W 12/06; H04W 12/08
See application file for complete search history.

(56) References Cited

U.S. PATENT DOCUMENTS

2008/0155654 A1   6/2008   Ross et al.
2008/0261561 A1  10/2008   Gehrmann
(Continued)

FOREIGN PATENT DOCUMENTS

CN    1874606 A    12/2006
CN  101933346 A    12/2010
(Continued)

*Primary Examiner* — Hee K Song
(74) *Attorney, Agent, or Firm* — Slater Matsil, LLP

(57) ABSTRACT

A virtual card downloading method, and a terminal, and an intermediate device for virtual card downloading. A virtual card downloading method includes determining, by a terminal, a preset scenario condition, and reporting terminal information to a server when the preset scenario condition is satisfied, wherein the terminal information in configured to enable the server to create an account for the terminal and to associate the account with virtual card data. The method further includes accessing the server by the terminal and by using the account, and downloading, by the terminal from the server, the virtual card data associated with the account. The scenario condition is that the terminal establishes a communication connection to the server.

18 Claims, 9 Drawing Sheets

(56) References Cited

U.S. PATENT DOCUMENTS

| | | | |
|---|---|---|---|
| 2009/0163175 A1* | 6/2009 | Shi | H04W 8/205 |
| | | | 455/411 |
| 2010/0311391 A1* | 12/2010 | Siu | H04W 8/205 |
| | | | 455/411 |
| 2010/0311402 A1* | 12/2010 | Srinivasan | H04W 8/183 |
| | | | 455/418 |
| 2010/0311468 A1 | 12/2010 | Shi et al. | |
| 2012/0047227 A1 | 2/2012 | Haggerty et al. | |
| 2012/0108205 A1 | 5/2012 | Schell et al. | |
| 2012/0108207 A1 | 5/2012 | Schell et al. | |
| 2014/0057558 A1 | 2/2014 | Cooper | |
| 2014/0172741 A1 | 6/2014 | Liu et al. | |
| 2014/0315535 A1* | 10/2014 | Bajko | H04W 8/20 |
| | | | 455/419 |
| 2015/0161382 A1* | 6/2015 | Boivie | G06F 21/53 |
| | | | 726/28 |
| 2016/0007070 A1 | 1/2016 | Yang | |
| 2016/0189135 A1* | 6/2016 | Hird | G06Q 20/3224 |
| | | | 705/21 |

FOREIGN PATENT DOCUMENTS

| | | |
|---|---|---|
| CN | 102238204 A | 11/2011 |
| CN | 102457833 A | 5/2012 |
| CN | 102461228 A | 5/2012 |
| CN | 102694781 A | 9/2012 |
| CN | 103152624 A | 6/2013 |
| DE | 102004049611 A1 | 4/2006 |
| EP | 2076071 A1 | 7/2009 |
| TW | 201234831 A | 8/2012 |

\* cited by examiner

VIRTUAL CARD DOWNLOADING METHOD, TERMINAL, AND INTERMEDIATE DEVICE

CROSS-REFERENCE TO RELATED APPLICATIONS

This patent application is a national phase filing under section 371 of PCT/CN2014/076347, filed Apr. 28, 2014 which is incorporated herein by reference in its entirety.

TECHNICAL FIELD

The present invention relates to the field of communications technologies, and in particular, to a virtual card downloading method, a terminal, and an intermediate device.

BACKGROUND

Virtual SIM card (virtual sim card, VSIM for short) is a totally new concept currently in the field of mobile terminals. From the perspective of functions, the VSIM may take the place of a physical SIM card that is currently put inside a terminal. The VSIM can be downloaded conveniently by using a network, and provides more convenience for a user to use services, such as roaming services.

A user that uses the VSIM does not need to insert another physical SIM card into a mobile phone except a home location SIM card, but applies for a server by using a newly created number, uses a data channel of a communications standard 2G/3G or another standard, downloads and installs VSIM data that is equivalent to another SIM card to the mobile phone, so that the user has an extra mobile phone number.

In the prior art, downloading of the VSIM is all implemented through the Internet, that is, a terminal connected to the Internet may download, directly through the Internet, the VSIM from a data server deployed by an operator. It can be seen that, downloading of the VSIM is very convenient, but the constraint is also very obvious, that is, the implementation should rely on the Internet.

Because of this, disadvantages of the prior art are: when a user cannot connect to the Internet due to reasons of roaming, crossing service areas, or the like, the user cannot normally download the VSIM and cannot use related services.

SUMMARY

The present invention provides a virtual card downloading method, a terminal, and an intermediate device, so that by means of a method for presetting a virtual card or a method for downloading a virtual card by using an intermediate device, the terminal can normally use a VSIM service without being connected to the Internet.

To resolve the foregoing technical problem, technical solutions used by the present invention are disclosed herein.

According to a first aspect, the present invention provides a virtual card downloading method, where the method includes presetting, by a terminal, a scenario condition, and reporting terminal information to a server when the preset scenario condition is satisfied, where the terminal information is used to enable the server to create an account for the terminal and to associate the account with virtual card data. The terminal accesses the server by using the account, and downloading the virtual card data associated with the account. The scenario condition is that the terminal establishes a communication connection to the server.

In a first possible implementation manner of the first aspect, the method further includes performing, by the terminal, encryption negotiation with the server, and obtaining a negotiation key, where the negotiation key is used to enable the server to encrypt the account and the virtual card data by using the negotiation key. In a second possible implementation manner of the first aspect, the accessing, by the terminal, the server by using the account, and downloading the virtual card data associated with the account includes decrypting, by the terminal, the account of the terminal by using the negotiation key, and accessing the server by using the account; and decrypting, by the terminal by using the negotiation key, the virtual card data associated with the account, and downloading the virtual card data.

According to a second aspect, the present invention provides a virtual card downloading method, where the method includes establishing, by a terminal, a communication connection to an intermediate device connected to a server, reporting, by the terminal, terminal information to the server by using the intermediate device, where the terminal information is used to enable the server to create an account for the terminal and to associate the account with virtual card data, and accessing, by the terminal, the intermediate device by using the account, and downloading the virtual card data associated with the account.

In a first possible implementation manner of the second aspect, the establishing, by a terminal, a communication connection to an intermediate device includes establishing, by the terminal, a near field communication connection to the intermediate device.

In a second possible implementation manner of the second aspect, the method further includes performing, by the terminal, encryption negotiation with a server public key stored in the intermediate device, and obtaining a negotiation key, where the negotiation key is used to enable the server or the intermediate device to encrypt the account and the virtual card data by using the negotiation key.

In a third possible implementation manner of the second aspect, the accessing, by the terminal, the intermediate device by using the account, and downloading the virtual card data associated with the account includes decrypting, by the terminal, the account of the terminal by using the negotiation key, and accessing the intermediate device by using the account; and decrypting, by the terminal by using the negotiation key, the virtual card data associated with the account, and downloading the virtual card data.

According to a third aspect, the present invention provides a virtual card downloading method, where the method includes establishing, by an intermediate device, a communication connection to a terminal, and connecting, by the intermediate device, to a server, receiving, by the intermediate device, terminal information reported by the terminal, sending, by the intermediate device, the terminal information to the server, where the terminal information is used by the server to create an account for the terminal and to determine virtual card data associated with the account, and receiving, by the intermediate device, access of the terminal, and sending the virtual card data to the terminal.

In a first possible implementation manner of the third aspect, the establishing, by an intermediate device, a communication connection to a terminal includes establishing, by the intermediate device, a near field communication connection to the terminal.

In a second possible implementation manner of the third aspect, the sending, by the intermediate device, the virtual card data to the terminal includes searching, by the intermediate device, to find whether the virtual card data is stored in storage of the intermediate device, and if the virtual card data is stored in the storage of the intermediate device, extracting the virtual card data from the storage of the intermediate device and sending the virtual card data; otherwise, acquiring, by the intermediate device, the virtual card data from the server and sending the virtual card data to the terminal.

In a third possible implementation manner of the third aspect, the method further includes performing, by the intermediate device, encryption negotiation with the terminal by using a server public key stored in the intermediate device, obtaining a negotiation key, and encrypting the account and the virtual card data by using the negotiation key.

In a fourth possible implementation manner of the third aspect, the encrypting the account and the virtual card data by using the negotiation key includes searching, by the intermediate device, to find whether the negotiation key is stored in storage of the intermediate device, and if the negotiation key is stored in the storage of the intermediate device, performing, by the intermediate device, encryption by using the negotiation key stored in the storage of the intermediate device; otherwise, acquiring, by the intermediate device, the negotiation key from the server and performing encryption.

According to a fourth aspect, the present invention provides a terminal, where the terminal includes a first reporting module, configured to preset a scenario condition, and report terminal information to a server when the preset scenario condition is satisfied, where the terminal information is used to enable the server to create an account for the terminal and to associate the account with virtual card data, and the scenario condition is that the terminal establishes a communication connection to the server, and a first downloading module, configured to access the server by using the account, and download the virtual card data associated with the account.

In a first possible implementation manner of the fourth aspect, the terminal further includes a first negotiation module, configured to perform encryption negotiation with the server, and obtain a negotiation key, where the negotiation key is used to enable the server to encrypt the account and the virtual card data by using the negotiation key, and a first decryption module, configured to decrypt the account of the terminal by using the negotiation key, and decrypt, by using the negotiation key, the virtual card data associated with the account.

According to a fifth aspect, the present invention provides a terminal, where the terminal includes a communications module, configured to establish a communication connection to an intermediate device connected to a server, a second reporting module, configured to report terminal information to the server by using the intermediate device, where the terminal information is used to enable the server to create an account for the terminal and to associate the account with virtual card data, and a second downloading module, configured to access the intermediate device by using the account, and download the virtual card data associated with the account.

In a first possible implementation manner of the fifth aspect, the terminal further includes a second negotiation module, configured to perform encryption negotiation with a server public key stored in the intermediate device, and obtain a negotiation key, where the negotiation key is used to enable the server or the intermediate device to encrypt the account and the virtual card data by using the negotiation key, and a second decryption module, configured to decrypt the account of the terminal by using the negotiation key, and decrypt, by using the negotiation key, the virtual card data associated with the account.

According to a sixth aspect, the present invention provides an intermediate device, where the intermediate device includes a connection module, configured to establish a communication connection to a terminal, and connect to a server, a reporting module, configured to receive terminal information reported by the terminal, and send the terminal information to the server, where the terminal information is used by the server to create an account for the terminal and to determine virtual card data associated with the account. The device further includes an exchange module, configured to receive access of the terminal, and send the virtual card data to the terminal.

In a first possible implementation manner of the sixth aspect, the exchange module includes a querying unit, configured to search to find whether the virtual card data is stored in a storage module, a storage unit, configured to store the virtual card data and send the virtual card data to the terminal, and an acquiring unit, configured to: when the virtual card data is not stored in the storage module, acquire the virtual card data from the server and store the virtual card data into the storage unit.

In a second possible implementation manner of the sixth aspect, the intermediate device further includes an encryption module, configured to perform encryption negotiation with the terminal by using a server public key stored in the intermediate device, obtain a negotiation key, and encrypt the account and the virtual card data by using the negotiation key.

According to a seventh aspect, the present invention provides a terminal, where the terminal includes: a processor, a sender, and a receiver, the processor is connected to the sender, and the processor is connected to the receiver, where the processor is configured to preset a scenario condition, where the scenario condition is that the terminal establishes a communication connection to a server. The sender is configured to, when the preset scenario condition is satisfied, report terminal information to the server, where the terminal information is used to enable the server to create an account for the terminal and to associate the account with virtual card data; and access the server by using the account, and the receiver is configured to: after the sender accesses the server by using the account, download the virtual card data associated with the account.

In a first possible implementation manner of the seventh aspect, the processor is further configured to perform encryption negotiation with the server, and obtain a negotiation key, where the negotiation key is used to enable the server to encrypt the account and the virtual card data by using the negotiation key; decrypt the account of the terminal by using the negotiation key, and decrypt, by using the negotiation key, the virtual card data associated with the account. The sender is configured to, after the processor decrypts the account of the terminal by using the negotiation key, access the server by using the account, and the receiver is specifically configured to: after the processor decrypts, by using the negotiation key, the virtual card data associated with the account, download the virtual card data associated with the account.

According to an eighth aspect, the present invention provides a terminal, where the terminal includes: a processor, a sender, and a receiver, the processor is connected to the sender, and the processor is connected to the receiver. The processor is configured to establish a communication connection to an intermediate device connected to a server, the sender is configured to report terminal information to the server by using the intermediate device. The terminal information is used to enable the server to create an account for the terminal and to associate the account with virtual card data; and access the server by using the account. The receiver is configured to, after the sender accesses the server by using the account, download the virtual card data associated with the account.

In a first possible implementation manner of the eighth aspect, the processor is further configured to perform encryption negotiation with a server public key stored in the intermediate device, and obtain a negotiation key, where the negotiation key is used to enable the server or the intermediate device to encrypt the account and the virtual card data by using the negotiation key; decrypt the account of the terminal by using the negotiation key; and decrypt, by using the negotiation key, the virtual card data associated with the account. The sender is specifically configured to: after the processor decrypts the account of the terminal by using the negotiation key, access the server by using the account, and the receiver is specifically configured to: after the processor decrypts, by using the negotiation key, the virtual card data associated with the account, download the virtual card data associated with the account.

According to a ninth aspect, the present invention provides an intermediate device, where the intermediate device includes: a processor, a sender, and a receiver, the processor is connected to the sender, and the processor is connected to the receiver. The processor is configured to establish a communication connection to a terminal, and connect to a server, the sender is configured to send terminal information to the server, where the terminal information is used by the server to create an account for the terminal and to determine virtual card data associated with the account; and send the virtual card data to the terminal, and the receiver is configured to receive the terminal information reported by the terminal, and receive access of the terminal.

In a first possible implementation manner of the ninth aspect, the processor is further configured to search to find whether the virtual card data is stored in storage of the intermediate device, and if the virtual card data is stored in the storage of the intermediate device, extract the virtual card data from the storage of the intermediate device. The receiver is further configured to: when the virtual card data is not stored in the storage of the intermediate device, acquire the virtual card data from the server.

In a second possible implementation manner of the ninth aspect, the processor is further configured to perform encryption negotiation with the terminal by using a server public key stored in the intermediate device, obtain a negotiation key, and encrypt the account and the virtual card data by using the negotiation key.

According to a tenth aspect, the present invention provides a terminal, where the terminal includes: a memory, where the memory is configured to store preset virtual card data.

In a first possible implementation manner of the tenth aspect, the terminal further includes: a processor and a data transmission module; the processor is connected to the memory; and the processor is connected to the data transmission module, where before the memory stores the preset virtual card data, the data transmission module is configured to establish a physical connection to a first device, and the processor is configured to: after the data transmission module establishes the physical connection to the first device, acquire the preset virtual card data by using the data transmission module.

It can be known according to the foregoing technical solutions that, beneficial effects existing in the present invention are: a scenario condition is preset, so that a terminal downloads virtual card data in advance when establishing a communication connection to a server; or an intermediate device and a terminal are connected by means of near field communication, so that the intermediate device indirectly connects the terminal and the server, and therefore the terminal can download the virtual card data without Internet, which avoids a special case in which if a terminal happens to be not connected to the Internet when a user is in urgent need of using a virtual card service, application of the virtual card service is hindered.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To enable a person skilled in the art to better understand the solutions in the embodiments of the present invention, the following describes the embodiments of the present invention in more detail with reference to accompanying drawings and implementation manners.

At the present stage, a terminal generally relies on the Internet, especially, the mobile Internet, to download virtual card (that is, VSIM) data from a server. If the terminal always keeps connected to the Internet, the terminal can download virtual card data at any time when needing to start using a virtual card service, which is very convenient and efficient. However, a manner that the terminal merely relies on the Internet to download virtual card data has obvious constraints. For example, when the terminal is in a special scenario such as roaming, crossing service areas, or the like, the terminal cannot keep connected to the Internet or it is inconvenient for the terminal to keep connected to the Internet, and then, the terminal cannot start using the virtual card service.

Moreover, in many cases, the user is in urgent need of using the virtual card service in the special scenario such as roaming, crossing service areas, or the like. It can be seen that the manner that the terminal merely relies on the Internet to download the virtual card data has relatively serious shortcomings, which is also a problem to be resolved in the present invention.

Figure 1:
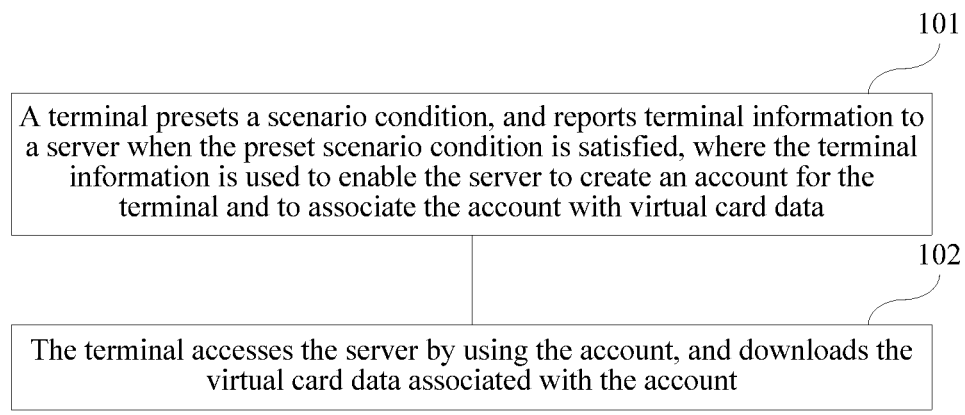
FIG. 1 and FIG. 2 are flowcharts of methods according to an embodiment of the present invention.

Referring to FIG. 1, FIG. 1 is a specific embodiment of a method described in the present invention. This embodiment describes a process of downloading virtual card data on a side of a terminal, and the method specifically includes the following steps:

Step 101: The terminal presets a scenario condition, and reports terminal information to a server when the preset scenario condition is satisfied, where the terminal information is used to enable the server to create an account for the terminal and to associate the account with virtual card data.

To avoid a special case in which if the terminal happens to be not connected to the Internet when a user is in urgent need of using a virtual card service, application of the virtual card service is hindered, in this embodiment, the scenario condition is preset for the terminal, so that the terminal automatically triggers a virtual card data downloading process in the scenario condition.

In this embodiment, the scenario condition is that the terminal establishes a communication connection to the server. That is, the terminal automatically triggers downloading of the virtual card data when a network condition is good, and obtains the virtual card data in advance. In this way, the terminal can directly start using the virtual card service when there is a need.

It should further be noted that, the foregoing communication connection between the terminal and the server is not merely limited to Internet connection. All communication connections that can implement downloading of the virtual card data fall within the overall solutions of this embodiment, and no specific limitation is needed herein.

After the virtual card data downloading process is triggered, the terminal first reports the terminal information to the server. The terminal information may include information that indicates an identity of the terminal, such as an IMEI (International Mobile Equipment Identity, that is, international mobile equipment identity), a CPU sequence number, and an MAC (Media Access Control) address of the terminal. After receiving the terminal information, the server creates an account for the terminal according to the terminal information, where the account fixedly corresponds to the terminal. Meanwhile, the server acquires virtual card data that is provided for the terminal by an operator, and associates the virtual card data with the account, so that the terminal downloads the virtual card data subsequently. The associating the virtual card data with the account means that the virtual card data can be directly invoked by using the account, and when the terminal accesses the account, the terminal can download, directly from the account, the virtual card data needed by the terminal.

Step 102: The terminal accesses the server by using the account, and downloads the virtual card data associated with the account.

After the server creates the corresponding account for the terminal and associates the account with the virtual card data, when the terminal accesses the server by using the account, the server can verify the terminal information included in the terminal (query the IMEI, the CPU sequence number, the MAC address, and the like of the terminal), and then receives access of the terminal. Then, the terminal downloads, by means of the communication connection, the virtual card data associated with the account of the terminal.

It can be known according to the foregoing technical solution that, beneficial effects existing in this embodiment are: a scenario condition is preset, so that a terminal downloads virtual card data in advance when establishing a communication connection to a server, thereby avoiding a special case in which if a terminal happens to be not connected to the Internet when a user is in urgent need of using a virtual card service, application of the virtual card service is hindered.

In an embodiment of the present invention, the server may be an operator server, and that the terminal downloads, in the preset scenario condition, the virtual card data associated with the account may be specifically: the terminal downloads, in a preset scenario, the virtual card data by using a data transmission channel of the operator server. For example, the operator server learns account information of a universal integrated circuit card (Universal Integrated Circuit Card, UICC) of the terminal, and the operator server may push the virtual card data or an acquisition link of the virtual card data in a manner of a short message service message or a multimedia message. In the preset scenario condition, that is, when the terminal may establish a communication connection to the operator server, the terminal receives the short message service message or multimedia message sent by the operator server, and downloads the virtual card data in advance by using a data transmission channel between the terminal and the operator server, so that the terminal can invoke the virtual card data when the terminal cannot be connected to the server but is in urgent need of using the virtual card service.

Figure 2:
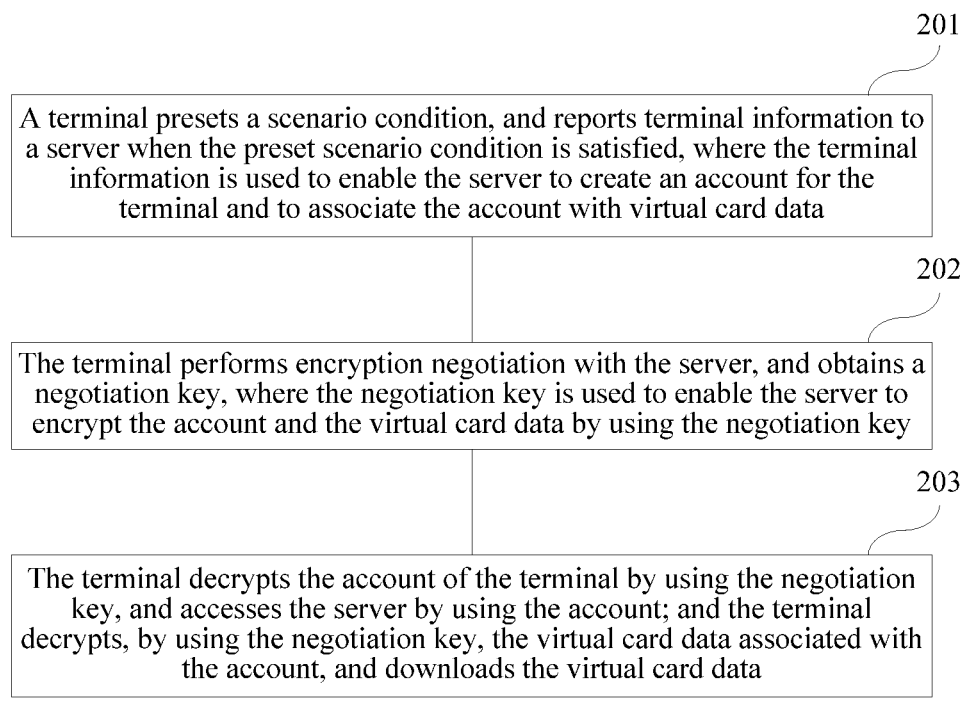

Referring to FIG. 2, FIG. 2 is another specific embodiment of a method described in the present invention. On the basis of the embodiment shown in FIG. 1, in this embodiment, a technical solution of encryption negotiation is added. The method in this embodiment includes the following steps:

Step 201: A terminal presets a scenario condition, and reports terminal information to a server when the preset scenario condition is satisfied, where the terminal information is used to enable the server to create an account for the terminal and to associate the account with virtual card data. The scenario condition is that the terminal establishes a communication connection to the server.

Step 202: The terminal performs encryption negotiation with the server, and obtains a negotiation key, where the negotiation key is used to enable the server to encrypt the account and the virtual card data by using the negotiation key.

In this embodiment, after the account is created and the virtual card data is associated with the account, to ensure security of the account and the virtual card data, the technical solution of encryption negotiation is added. The encryption negotiation is specifically DH negotiation (key exchange protocol/algorithm (Diffie-Hellman)). The DH negotiation is an existing encryption technology, and the principle of the DH negotiation may be briefly summarized as: two parties negotiate by using the DH algorithm and obtain a symmetric negotiation key, and then perform encryption and decryption by using the negotiation key. After the terminal performs DH negotiation with the server, the negotiation key is obtained. In this embodiment, the negotiation key includes two key pairs, that is, a server public key and a server private key, and a terminal public key and a terminal private key. According to the principle of the DH negotiation, in this step, the server encrypts, by using the server public key, the server private key, and the terminal public key of the two key pairs, the account and the virtual card data associated with the account.

Step 203: The terminal decrypts the account of the terminal by using the negotiation key, and accesses the server by using the account; and the terminal decrypts, by using the negotiation key, the virtual card data associated with the account, and downloads the virtual card data.

Because the account and the virtual card data are already encrypted, the terminal can access the account and download the virtual card data only after performing decryption. According to the principle of the DH negotiation, in this step, the terminal decrypts the account and the virtual card data by using the terminal public key, the terminal private key, and the server public key. It should be noted that, the account and the virtual card data are both encrypted by using the negotiation key, that is, the terminal first needs to decrypt the account before performing accessing and downloading the virtual card data, and further needs to decrypt the virtual card data before implementing a virtual card-related service by using the virtual card data.

It can be known according to the foregoing technical solution that, beneficial effects existing in this embodiment are: the technical solution of encryption negotiation is added in the method, so that security of an account and virtual card data of a terminal is ensured.

Figure 3:
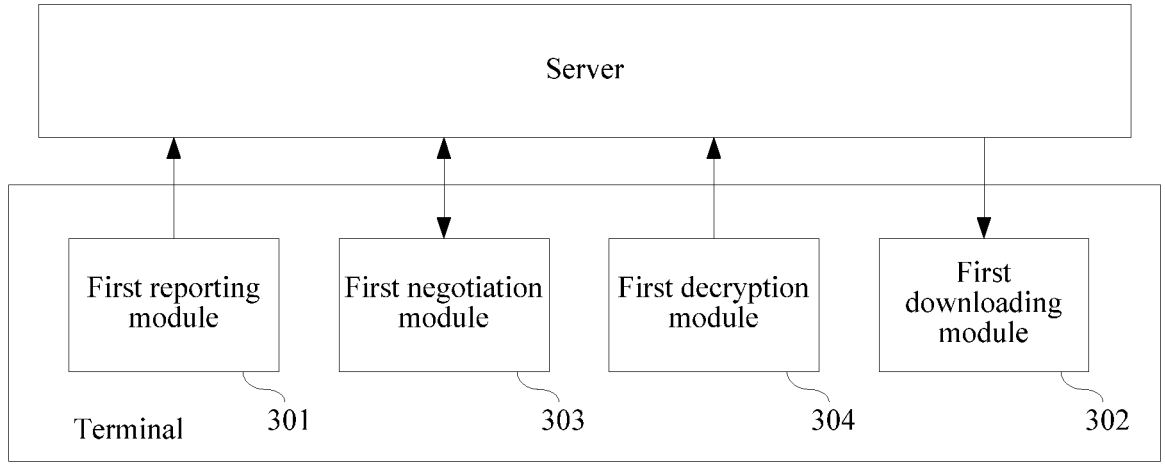
FIG. 3 is a schematic structural diagram of a terminal according to an embodiment of the present invention.

Referring to FIG. 3, FIG. 3 is a specific embodiment of a terminal described in the present invention. In this embodiment, the terminal is a device that downloads virtual card data according to the methods shown in FIG. 1 and FIG. 2. The terminal includes a first reporting module 301, configured to preset a scenario condition, and report terminal information to a server when the preset scenario condition is satisfied, where the terminal information is used to enable the server to create an account for the terminal and to associate the account with virtual card data, and the scenario condition is that the terminal establishes a communication connection to the server, a first downloading module 302, configured to access the server by using the account, and download the virtual card data associated with the account, a first negotiation module 303, configured to perform encryption negotiation with the server, and obtain a negotiation key, where the negotiation key is used to enable the server to encrypt the account and the virtual card data by using the negotiation key, and a first decryption module 304, configured to decrypt the account of the terminal by using the negotiation key, and decrypt, by using the negotiation key, the virtual card data associated with the account.

It can be known according to the foregoing technical solution that, beneficial effects existing in the terminal in this embodiment are: a scenario condition is preset, so that the terminal downloads virtual card data in advance when establishing a communication connection to a server, thereby avoiding a special case in which if a terminal happens to be not connected to the Internet when a user is in urgent need of using a virtual card service, application of the virtual card service is hindered; security of an account and virtual card data of a terminal is ensured by using the technical solution of encryption negotiation.

The three embodiments shown in FIG. 1 to FIG. 3 describe a method of resolving the problem in the prior art by using a scenario condition, and a corresponding terminal. Besides, the embodiments of the present invention further provide technical solutions of resolving related technical problems by using an intermediate device between a terminal and a server, and the technical solutions are specifically described in the following several embodiments.

Figure 4:
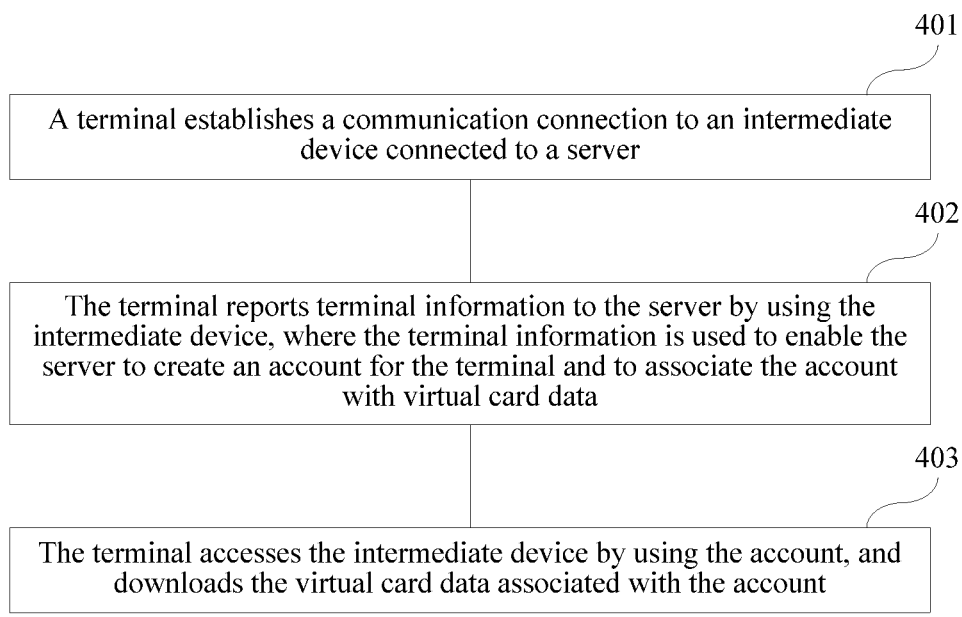
FIG. 4 and FIG. 5 are flowcharts of methods according to another embodiment of the present invention.

Referring to FIG. 4, FIG. 4 is another specific embodiment of a virtual card downloading method according to an embodiment of the present invention. This embodiment describes a process of downloading virtual card data on a side of a terminal, and the method specifically includes the following steps.

Step 401: A terminal establishes a communication connection to an intermediate device connected to a server.

In this embodiment, when there is no communications network for the terminal to be directly connected to the server, the terminal may be indirectly connected to and communicate with the server by using the intermediate device. The terminal and the intermediate device are connected in a near field communication (such as Bluetooth or wifi) manner.

The intermediate device may be considered as extension for deployment of the server, and naturally has a connection relationship with the server. Each intermediate device covers a particular range (a range in which near field communication can be achieved) from the perspective of communication. If a terminal that is not connected to a network needs to download virtual card data and use a virtual card service, the terminal needs to be placed within the coverage range of the intermediate device, and is connected to the intermediate device by means of near field communication that is not affected by a network, which is equivalent to that communication with the server can be implemented. Therefore, the problem that the terminal cannot download virtual card data when being not connected to a network is resolved.

Step 402: The terminal reports terminal information to the server by using the intermediate device, where the terminal information is used to enable the server to create an account for the terminal and to associate the account with virtual card data.

Step 403: The terminal accesses the intermediate device by using the account, and downloads the virtual card data associated with the account.

In this embodiment, the terminal directly communicates with the intermediate device, but a device that specifically creates the account for the terminal and provides the virtual card data is still the server. Therefore, reporting of the terminal information and downloading of the virtual card data both need to be transferred between the terminal and the server by using the intermediate device. Except for this, other technical features in this embodiment are all consistent with those of the embodiment shown in FIG. 1.

Figure 5:
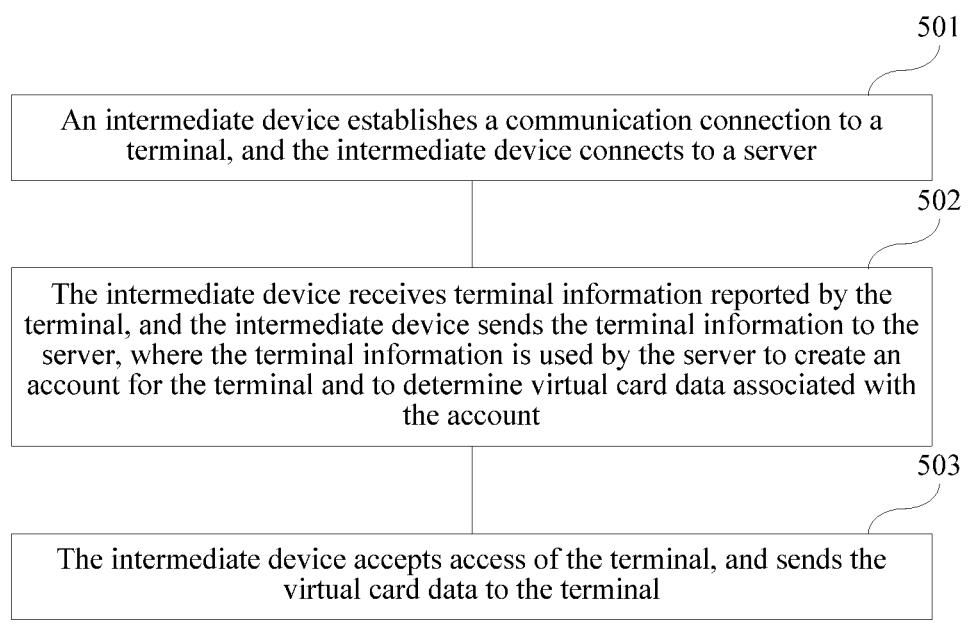

Referring to FIG. 5, FIG. 5 is a specific embodiment of a method described in the present invention. Corresponding to the embodiment shown in FIG. 4, this embodiment describes the downloading process from the perspective of an intermediate device. The method in this embodiment includes the following.

Step 501: An intermediate device establishes a communication connection to a terminal, and the intermediate device connects to a server.

It may be approximately considered that, the intermediate device is equivalent to a communication hot spot extensively deployed by the server, and within communication coverage of the intermediate device, the terminal can normally download virtual card data and use a virtual card service without being connected to the Internet. When the server deploys a large amount of intermediate devices, and continuously improves a coverage rate of the intermediate device, the terminal can download the virtual card data anywhere at any time.

Step 502: The intermediate device receives terminal information reported by the terminal, and the intermediate device sends the terminal information to the server, where the terminal information is used by the server to create an account for the terminal and to determine virtual card data associated with the account.

Step 503: The intermediate device receives access of the terminal, and sends the virtual card data to the terminal.

It can be known according to the technical solutions shown in FIG. 4 and FIG. 5 that, beneficial effects existing in the embodiments are: an intermediate device and a terminal are connected by means of near field communication, so that the intermediate device indirectly connects the terminal and the server, and therefore the terminal can download the virtual card data without the Internet, thereby avoiding a special case in which if a terminal happens to be not connected to the Internet when a user is in urgent need of using a virtual card service, application of the virtual card service is hindered.

Figure 6:
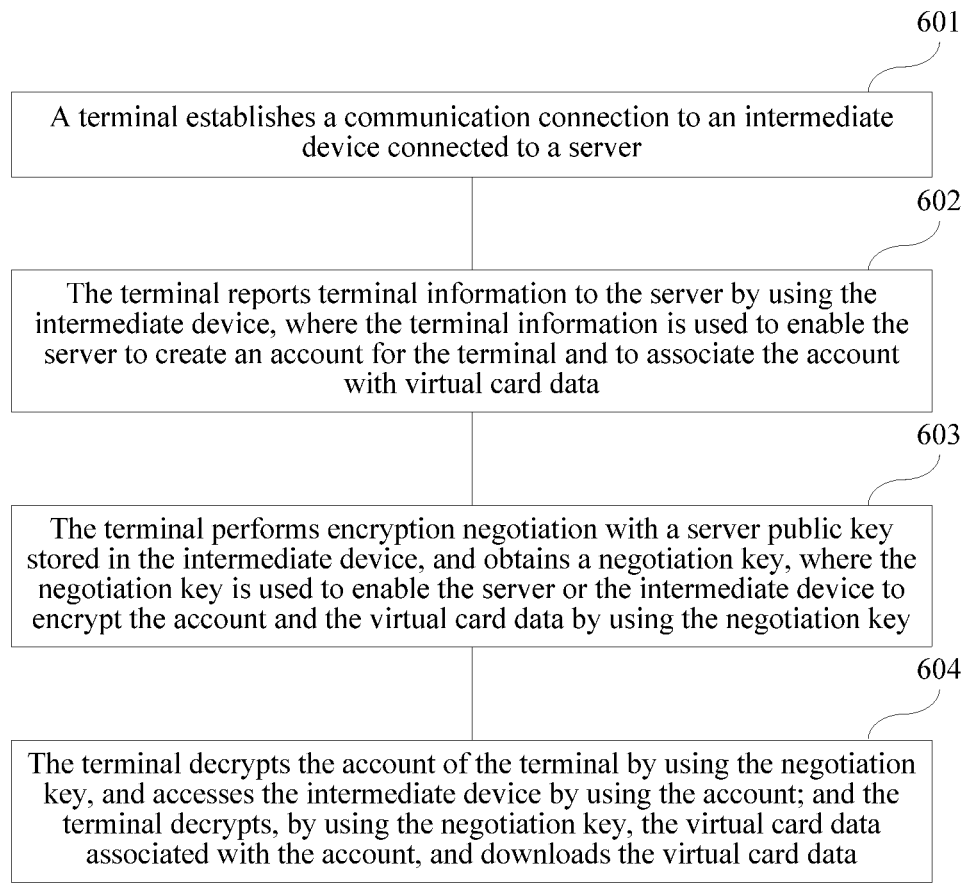
FIG. 6 and FIG. 7 are flowcharts of methods according to still another embodiment of the present invention.

The embodiments shown in FIG. 4 and FIG. 5 are embodiments of technologies of downloading virtual card data by using the intermediate device. To improve security of the technical solutions, similarly, an optimization solution of encryption negotiation may be added on the basis of the technical solutions. Specifically:

Referring to FIG. 6, FIG. 6 is another specific embodiment of a virtual card downloading method according to the present invention. The method in this embodiment includes the following.

Step 601: A terminal establishes a communication connection to an intermediate device connected to a server.

Step 602: The terminal reports terminal information to the server by using the intermediate device, where the terminal information is used to enable the server to create an account for the terminal and to associate the account with virtual card data.

Step 603: The terminal performs encryption negotiation with a server public key stored in the intermediate device, and obtains a negotiation key, where the negotiation key is used to enable the server or the intermediate device to encrypt the account and the virtual card data by using the negotiation key.

In this embodiment, the encryption negotiation is also DH negotiation. Specifically, the terminal performs DH negotiation with the server public key, but in this embodiment, the terminal is no longer directly connected to the server; therefore, the intermediate device stores the server public key, and replaces the server to perform DH negotiation with the terminal.

The DH negotiation is an existing encryption technology, and has been described in the foregoing embodiments, and the principle of the DH negotiation is not described herein again. After the terminal performs DH negotiation with the server public key, the terminal obtains the negotiation key, and the intermediate device and the server both should keep the negotiation key. In this embodiment, the negotiation key includes two key pairs, that is, a server public key and a server private key, and a terminal public key and a terminal private key. According to the principle of the DH negotiation, in this step, the intermediate device encrypts, by using the server public key, the server private key, and the terminal public key of the two key pairs, the account and the virtual card data associated with the account.

Step 604: The terminal decrypts the account of the terminal by using the negotiation key, and accesses the intermediate device by using the account; and the terminal decrypts, by using the negotiation key, the virtual card data associated with the account, and downloads the virtual card data.

Because the account and the virtual card data are already encrypted, the terminal can access the account and download the virtual card data only after performing decryption. According to the principle of the DH negotiation, in this step, the terminal decrypts the account and the virtual card data by using the terminal public key, the terminal private key, and the server public key.

Figure 7:
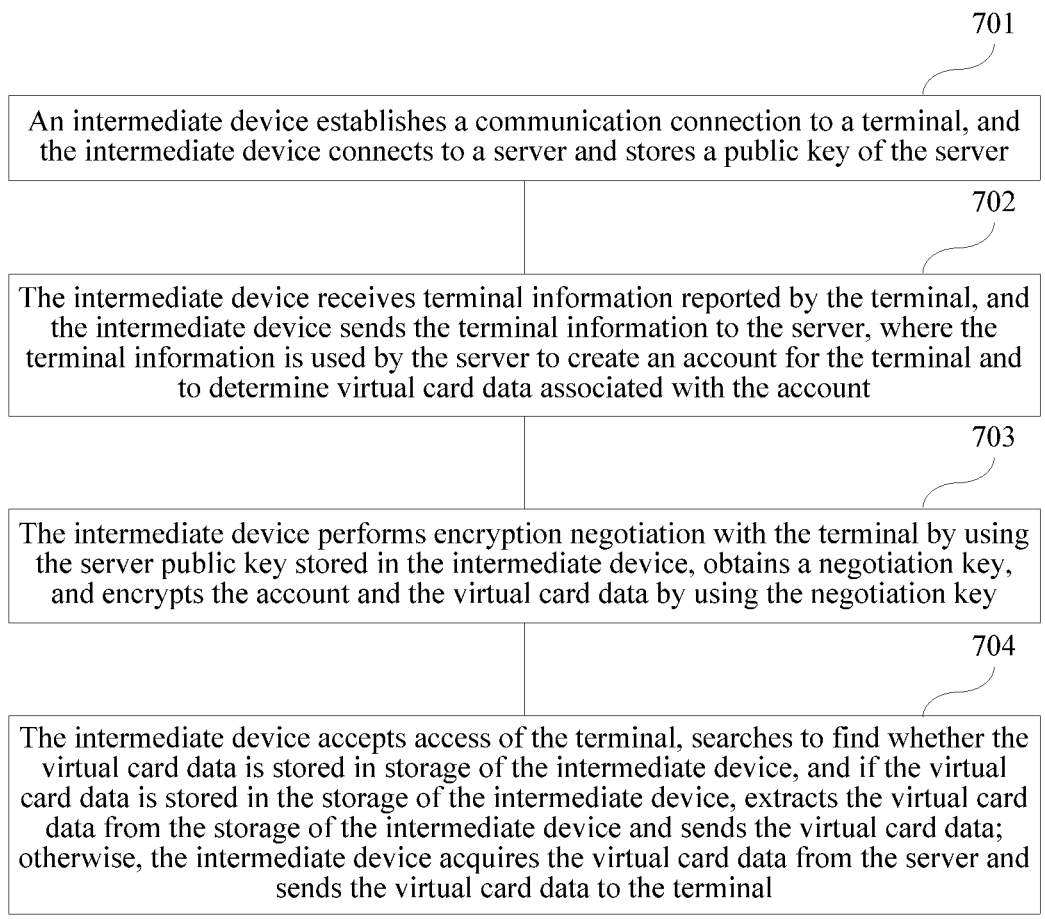

Referring to FIG. 7, FIG. 7 is still another specific embodiment of a method described in the present invention. Corresponding to the embodiment shown in FIG. 6, this embodiment describes the downloading process from the perspective of an intermediate device. The method in this embodiment is specifically:

Step 701: An intermediate device establishes a communication connection to a terminal, and the intermediate device connects to a server and stores a public key of the server.

Step 702: The intermediate device receives terminal information reported by the terminal, and the intermediate device sends the terminal information to the server, where the terminal information is used by the server to create an account for the terminal and to determine virtual card data associated with the account.

Step 703: The intermediate device performs encryption negotiation with the terminal by using the server public key stored in the intermediate device, obtains a negotiation key, and encrypts the account and the virtual card data by using the negotiation key.

Generally, after the intermediate device replaces the server to perform encryption negotiation with the terminal, the intermediate device itself should keep the negotiation key, but it is possible that the negotiation key is only kept in the server, but is not stored in the intermediate device. Therefore, in an encryption process, the intermediate device searches to find whether the negotiation key is stored in storage of the intermediate device, and if the negotiation key is stored in the storage of the intermediate device, the intermediate device performs encryption by using the negotiation key stored in the storage of the intermediate device; otherwise, the intermediate device acquires the negotiation key from the server and performs encryption.

Step 704: The intermediate device receives access of the terminal, searches to find whether the virtual card data is stored in storage of the intermediate device, and if the virtual card data is stored in the storage of the intermediate device, extracts the virtual card data from the storage of the intermediate device and sends the virtual card data; otherwise, the intermediate device acquires the virtual card data from the server and sends the virtual card data to the terminal.

The terminal completes a corresponding decryption process, accesses the intermediate device, and requests downloading of the virtual card data. In this case, the intermediate device first needs to search to find whether the virtual card data that the terminal needs to download is stored in the intermediate device, and if the virtual card data is stored in the intermediate device, the intermediate device directly provides downloading; if the virtual card data is not stored in the intermediate device, the intermediate device first needs to acquire the virtual card data from the server, and then provides downloading.

It can be known according to the foregoing technical solutions that, beneficial effects existing in the embodiments shown in FIG. 6 and FIG. 7 are: the technical solution of encryption negotiation is added in the method, so that security of an account and virtual card data of a terminal is ensured.

Figure 8:
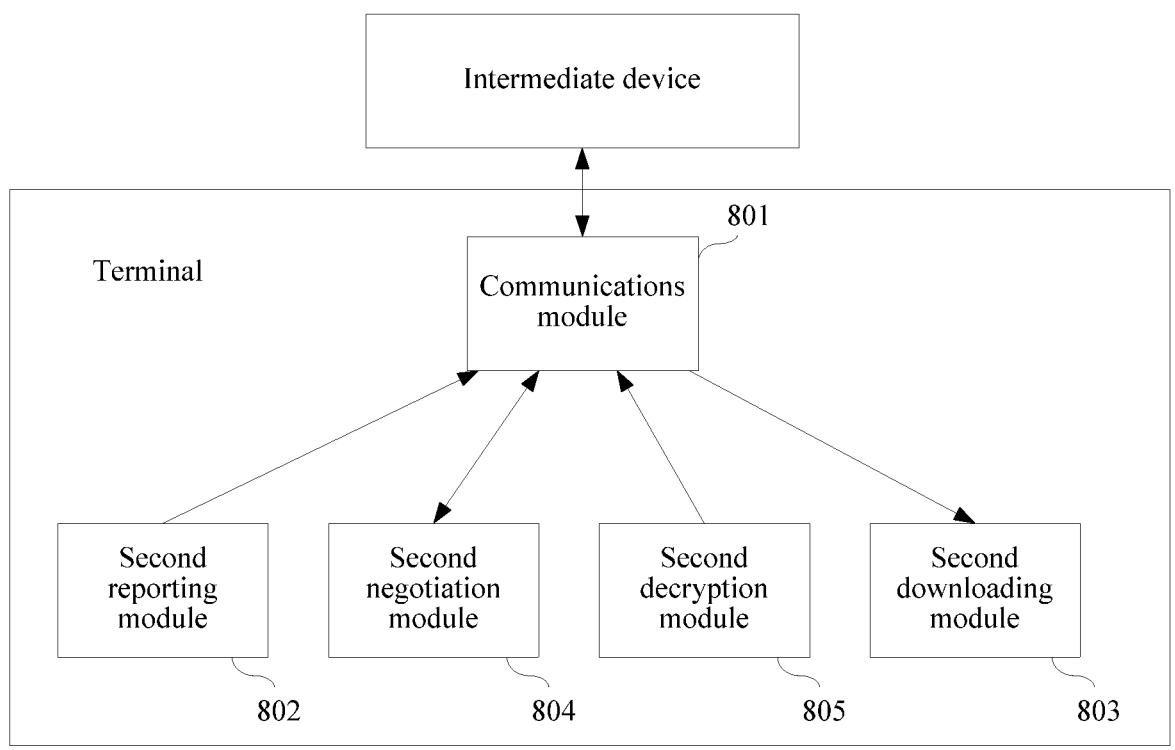
FIG. 8 is a schematic structural diagram of a terminal according to an embodiment of the present invention.

Corresponding to the embodiments shown in FIG. 4 to FIG. 7, a terminal and an intermediate device are correspondingly disclosed in the following. The terminal and the intermediate device are configured to implement the methods shown in FIG. 4 to FIG. 7. Specifically:

Referring to FIG. 8, the terminal includes a communications module 801, configured to establish a communication connection to an intermediate device connected to a server, a second reporting module 802, configured to report terminal information to the server by using the intermediate device, where the terminal information is used to enable the server to create an account for the terminal and to associate the account with virtual card data, and a second downloading module 803, configured to access the intermediate device by using the account, and download the virtual card data associated with the account. The terminal further includes a second negotiation module 804, configured to perform encryption negotiation with a server public key stored in the intermediate device, and obtain a negotiation key, where the negotiation key is used to enable the server or the intermediate device to encrypt the account and the virtual card data by using the negotiation key, and a second decryption module 805, configured to decrypt the account of the terminal by using the negotiation key, and decrypt, by using the negotiation key, the virtual card data associated with the account.

Figure 9:
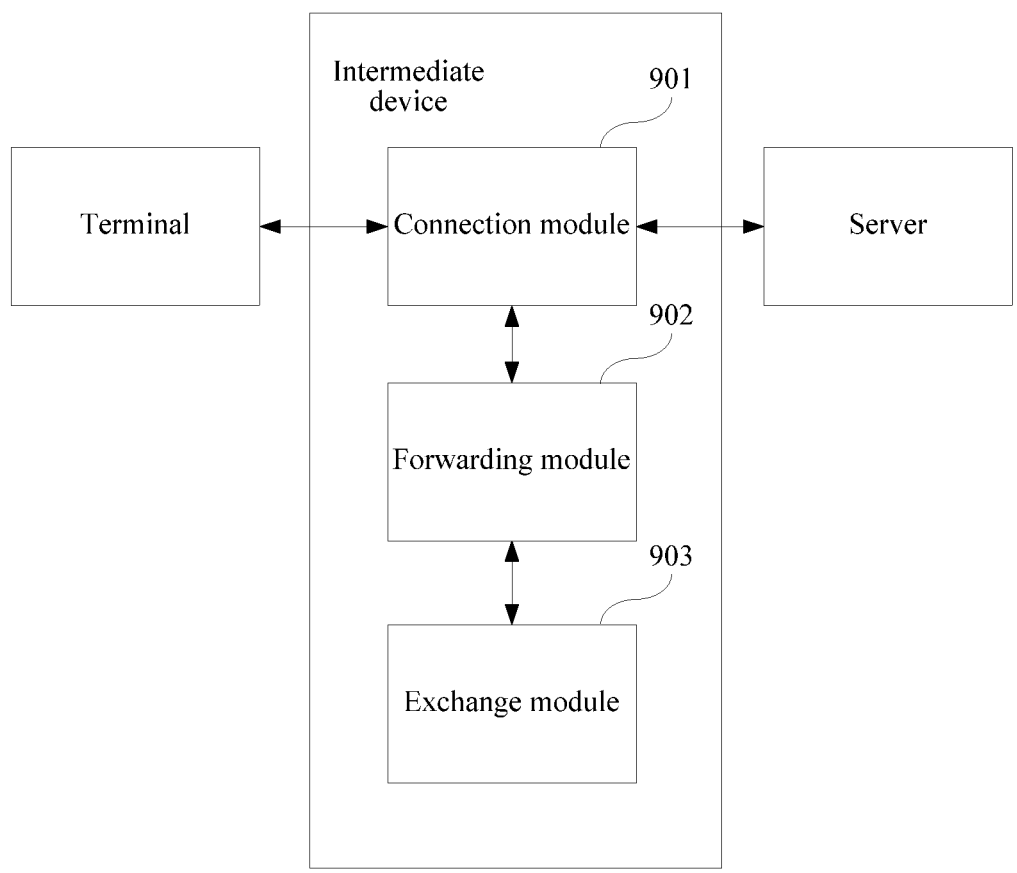
FIG. 9 is a schematic structural diagram of an intermediate device according to an embodiment of the present invention.

Referring to FIG. 9, the intermediate device includes a connection module 901, configured to establish a communication connection to a terminal, and connect to a server. A reporting module 902 is configured to receive terminal information reported by the terminal, and send the terminal information to the server, where the terminal information is used by the server to create an account for the terminal and to determine virtual card data associated with the account, and an exchange module 903 is configured to receive access of the terminal, and send the virtual card data to the terminal.

The exchange module includes a querying unit 931, configured to search to find whether the virtual card data is stored in a storage module, a storage unit 932, configured to store the virtual card data and send the virtual card data to the terminal, and an acquiring unit 933, configured to: when the virtual card data is not stored in the storage module, acquire the virtual card data from the server and store the virtual card data into the storage unit.

An encryption module 904 is configured to perform encryption negotiation with the terminal by using a server public key stored in the intermediate device, obtain a negotiation key, and encrypt the account and the virtual card data by using the negotiation key.

Beneficial effects existing in the embodiments shown in FIG. 8 and FIG. 9 are: an intermediate device and a terminal are connected by means of near field communication, so that the intermediate device indirectly connects the terminal and the server, and therefore the terminal can download the virtual card data without the Internet, thereby avoiding a special case in which if a terminal happens to be not connected to the Internet when a user is in urgent need of using a virtual card service, application of the virtual card service is hindered; the technical solution of encryption negotiation is added in the method, and security of an account and virtual card data of a terminal is ensured.

Figure 10:
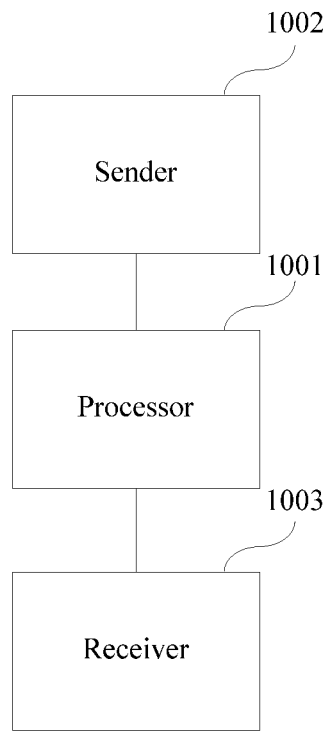
FIG. 10 is a schematic structural diagram of a terminal according to an embodiment of the present invention.

In an embodiment of the present invention, the terminal may preset virtual card data by interacting with a server. Referring to FIG. 10, the terminal in this embodiment includes a processor 1001, a sender 1002, a receiver 1003, and a memory 1004 (which is not shown in the figure), the processor 1001 is connected to the sender 1002, and the processor 1001 is connected to the receiver 1003. The processor 1001 is configured to preset a scenario condition, where the scenario condition is that the terminal establishes a communication connection to a server. The sender 1002 is configured to, when the preset scenario condition is satisfied, report terminal information to the server, where the terminal information is used to enable the server to create an account for the terminal and to associate the account with virtual card data; and access the server by using the account. The receiver 1003 is configured to, after the sender 1002 accesses the server by using the account, download the virtual card data associated with the account.

The processor 1001 is further configured to perform encryption negotiation with the server, and obtain a negotiation key, where the negotiation key is used to enable the server to encrypt the account and the virtual card data by using the negotiation key; decrypt the account of the terminal by using the negotiation key, and decrypt, by using the negotiation key, the virtual card data associated with the account. The sender 1002 is configured to, after the processor 1001 decrypts the account of the terminal by using the negotiation key, access the server by using the account. The receiver 1003 is specifically configured to, after the processor 1001 decrypts, by using the negotiation key, the virtual card data associated with the account, download the virtual card data associated with the account.

The memory 1004 is configured to store the terminal information, the virtual card data, and the negotiation key.

In an embodiment of the present invention, the terminal may preset virtual card data by indirectly interacting, by using an intermediate device, with a server. Referring to FIG. n and FIG. 12, the terminal and the intermediate device in this embodiment include the following.

Figure 11:
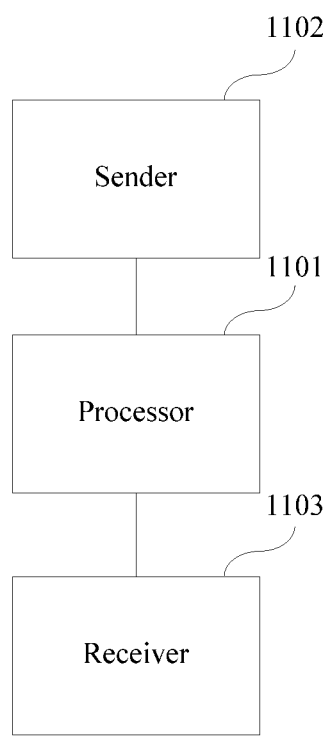
FIG. 11 and FIG. 12 are schematic structural diagrams of a terminal and an intermediate device according to an embodiment of the present invention.

Referring to FIG. 11, the terminal includes a processor 1101, a sender 1102, a receiver 1103, and a memory 1104 (which is not shown in the figure), the processor 1101 is connected to the sender 1102, and the processor 1101 is connected to the receiver 1103. The processor is configured to establish a communication connection to an intermediate device connected to a server. The sender is configured to report terminal information to the server by using the intermediate device, where the terminal information is used to enable the server to create an account for the terminal and to associate the account with virtual card data; and access the server by using the account, and the receiver is configured to: after the sender accesses the server by using the account, download the virtual card data associated with the account.

The processor is further configured to perform encryption negotiation with a server public key stored in the intermediate device, and obtain a negotiation key, where the negotiation key is used to enable the server or the intermediate device to encrypt the account and the virtual card data by using the negotiation key; decrypt the account of the terminal by using the negotiation key; and decrypt, by using the negotiation key, the virtual card data associated with the account. The sender is specifically configured to: after the processor decrypts the account of the terminal by using the negotiation key, access the server by using the account. The receiver is specifically configured to: after the processor decrypts, by using the negotiation key, the virtual card data associated with the account, download the virtual card data associated with the account.

The memory is configured to store the terminal information, the virtual card data, and the negotiation key.

Figure 12:
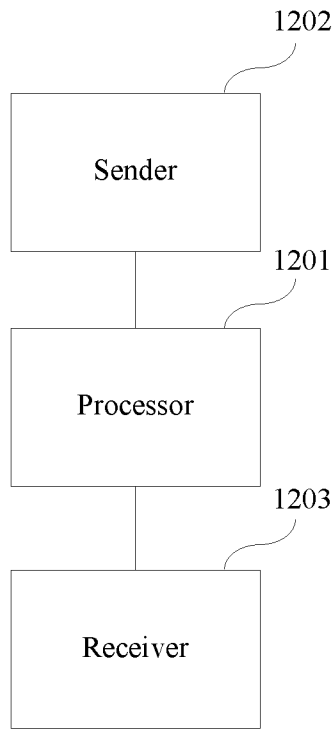

Referring to FIG. 12, the intermediate device includes: a processor, a sender, a receiver and a memory, the processor is connected to the sender, and the processor is connected to the receiver. The processor is configured to establish a communication connection to a terminal, and connect to a server. The sender is configured to send terminal information to the server, where the terminal information is used by the server to create an account for the terminal and to determine virtual card data associated with the account, and send the virtual card data to the terminal. The receiver is configured to receive the terminal information reported by the terminal, and receive access of the terminal.

The processor is further configured to search to find whether the virtual card data is stored in storage of the intermediate device, and if the virtual card data is stored in the storage of the intermediate device, extract the virtual card data from the storage of the intermediate device. The receiver is further configured to: when the virtual card data is not stored in the storage of the intermediate device, acquire the virtual card data from the server.

The processor is further configured to perform encryption negotiation with the terminal by using a server public key stored in the intermediate device, obtain a negotiation key, and encrypt the account and the virtual card data by using the negotiation key.

The memory is configured to store the terminal information, the server public key, the negotiation key, and the virtual card data.

Figure 13:
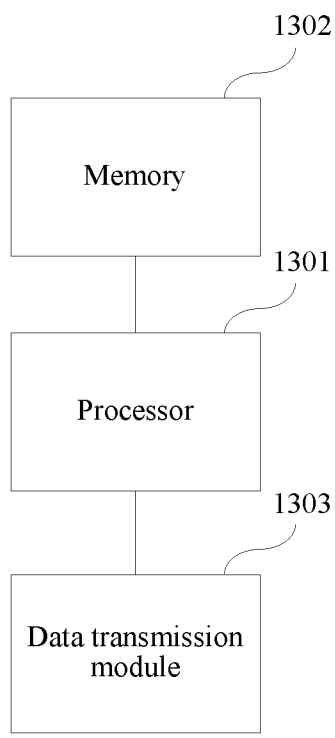
FIG. 13 is a schematic structural diagram of a terminal according to an embodiment of the present invention.

In an embodiment of the present invention, the terminal stores in advance virtual card data. Referring to FIG. 13, the terminal includes a memory, where the memory is configured to store the preset virtual card data.

The terminal further includes a processor and a data transmission module; the processor is connected to the memory, and the processor is connected to the data transmission module, where before the memory stores the preset virtual card data. The data transmission module is configured to establish a physical connection to a first device. The processor is configured to, after the data transmission module establishes the physical connection to the first device, acquire the preset virtual card data by using the data transmission module.

In this embodiment, the terminal may preset the virtual card data locally in the terminal. Specifically, as shown in FIG. 13, the terminal may include a memory, where the memory is configured to store the preset virtual card data. This embodiment of the present invention provides another manner of presetting virtual card data, where the terminal may not need to perform data exchange with a server before acquiring the virtual card data, and instead, one or more pieces of virtual card data are directly preset locally in the terminal, for example, one or more pieces of virtual card data is stored in a memory at delivery of the terminal.

Further, in an implementation manner of this embodiment of the present invention, as shown in FIG. 13, the terminal further includes: a processor and a data transmission module; the processor is connected to the memory; and the processor is connected to the data transmission module, where before the memory stores the preset virtual card data, the data transmission module is configured to establish a physical connection to a first device. The processor is configured to, after the data transmission module establishes the physical connection to the first device, acquire the preset virtual card data by using the data transmission module. Specifically, the terminal may not include virtual card data at delivery of the terminal, or merely include virtual card data of a fixed type. The terminal includes a data transmission module, and the data transmission module is configured to establish a physical connection to a first device, for example, the data transmission module may be a USB interface, and the first device may be a notebook computer. After the USB interface of the terminal and the notebook computer are connected by using a USB data line, the processor acquires, by using a USB data transmission channel between the terminal and the notebook computer, virtual card data stored in the notebook computer. The terminal acquires the virtual card data by means of the physical connection.

It should further be noted that, in all drawings of the specification of the present invention, a line segment with an arrow means that a signal flows along a direction of the arrow, and a line segment with two arrows of opposite directions means bidirectional interaction of signals; however, whether the foregoing line segment exists is not equivalent to whether an actual connection relationship between modules exists; based on needs for description of the specification of the present invention, a physical connection or a connection of another type between internal modules of a terminal is not specifically shown in the drawings.

As can be known from the foregoing descriptions of the implementation manners, a person skilled in the art may clearly understand that some or all steps of the methods in the embodiments may be implemented by software plus a necessary universal hardware platform. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network communication device such as a media gateway) to perform the methods described in the embodiments or some parts of the embodiments of the present invention.

It should be noted that the embodiments in this specification are all described in a progressive manner, for same or similar parts in the embodiments, mutual reference may be made to these embodiments, and each embodiment focuses on a difference from other embodiments. Especially, device and system embodiments are basically similar to a method embodiment, and therefore are described briefly; for related parts, refer to parts of descriptions in the method embodiment. The described device and system embodiments are merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

The foregoing descriptions are merely exemplary embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A method, comprising:
   determining, by a terminal, a preset scenario condition, wherein the preset scenario condition is that the terminal establishes a communication connection to an intermediate device;
   reporting, by the terminal, terminal information to a server via the intermediate device in response to the preset scenario condition being satisfied, the reporting causing the server to create an account for the terminal, according to the terminal information, and to associate the account with virtual card data;
   accessing, by the terminal, the server using the account via the intermediate device; and
   downloading, by the terminal from the server via the intermediate device, the virtual card data associated with the account; and
   wherein the method further comprises:
      performing, by the terminal, encryption negotiation with the intermediate device using a server public key; and
      obtaining a first negotiation key, wherein the account and the virtual card data are encrypted using the first negotiation key.

2. The method according to claim 1, further comprising:
   performing, by the terminal, encryption negotiation with the server; and
   obtaining a second negotiation key in response to the encryption negotiation,
   wherein the second negotiation key is configured to enable the server to encrypt the account and the virtual card data using the second negotiation key.

3. The method according to claim 1, further comprising:
   decrypting, by the terminal, the account using the first negotiation key; and
   decrypting, by the terminal and using the first negotiation key, the virtual card data associated with the account.

4. The method according to claim 1, further comprising:
   establishing, by the terminal information, a near field communication connection with the intermediate device.

5. The method according to claim 1, wherein the terminal is further configured to perform reporting the terminal information to the server, accessing the server, and downloading the virtual card data through a universal serial bus (USB) interface of the terminal.

6. The method of claim 1, wherein the terminal information comprises an identifier of the terminal.

7. A method, comprising:
   establishing, by an intermediate device, a communication connection to a terminal;
   connecting, by the intermediate device, to a server;
   receiving, by the intermediate device, terminal information reported by the terminal, in response to the terminal having determined that a preset scenario condition is satisfied, wherein the preset scenario condition is that the terminal establishes the communication connection to the intermediate device;
   sending, by the intermediate device, the terminal information to the server, causing the server to create an account for the terminal, according to the terminal information, and to determine virtual card data associated with the account; and
   receiving, by the intermediate device, access to the terminal, and sending the virtual card data to the terminal; and
   wherein sending the virtual card data to the terminal comprises:
      searching, by the intermediate device, to determine whether the virtual card data is stored in a storage of the intermediate device;
      extracting, in response to the virtual card data being stored in the storage of the intermediate device, the virtual card data from the storage of the intermediate device and sending the virtual card data to the terminal; and
      acquiring, by the intermediate device and in response to the virtual card data not being stored in the storage of the intermediate device, the virtual card data from the server and sending the virtual card data to the terminal.

8. The method according to claim 7, wherein establishing the communication connection to the terminal comprises:
   establishing, by the intermediate device, a near field communication connection to the terminal.

9. The method according to claim 7, wherein establishing the communication connection to the terminal comprises:
   establishing, by the intermediate device, a universal serial bus (USB) connection to the terminal.

10. The method according to claim 7, further comprising:
    performing, by the intermediate device, encryption negotiation with the terminal using a server public key stored in the intermediate device;
    obtaining a negotiation key; and
    encrypting the account and the virtual card data using the negotiation key.

11. The method according to claim 10, wherein encrypting the account and the virtual card data comprises:
    searching, by the intermediate device, to determine whether the negotiation key is stored in a storage of the intermediate device;
    performing, by the intermediate device in response to the negotiation key being stored in the storage of the intermediate device, encryption using the negotiation key stored in the storage of the intermediate device; and
    acquiring, by the intermediate device in response to the negotiation key not being stored in the storage of the intermediate device, the negotiation key from the server and performing the encryption using the negotiation key acquired from the server.

12. The method of claim 7, wherein the terminal information comprises an identifier of the terminal.

13. A terminal, comprising:
    a processor; and
    a non-transitory computer-readable storage medium storing a program to be executed by the processor, the program including instructions to:
       determine a preset scenario condition, wherein the preset scenario condition is that the terminal establishes a communication connection to an intermediate device;
       report terminal information to a server via the intermediate device in response to the preset scenario condition being satisfied, reporting of the terminal information causing the server to create an account for the terminal according to the terminal information, and to associate the account with virtual card data;
       access the server using the account via the intermediate device; and download, from the server via the intermediate device, the virtual card data associated with the account; and wherein the program further includes instructions to:

perform encryption negotiation with the intermediate device using a server public key; and obtain a first negotiation key, wherein the account and the virtual card data are encrypted using the first negotiation key.

14. The terminal according to claim 13, wherein the program further includes instructions to:

perform encryption negotiation with the server, and obtain a second negotiation key, wherein the second negotiation key is configured to enable the server to encrypt the account and the virtual card data using the second negotiation key.

15. The terminal according to claim 13, wherein the program further includes instructions to:

decrypt the account of the terminal using the first negotiation key, and decrypt the virtual card data associated with the account using the first negotiation key.

16. The terminal according to claim 15, wherein the instructions to decrypt the account of the terminal and decrypt the virtual card data include instructions to:

decrypt the account of the terminal using the first negotiation key; and decrypt, using the first negotiation key, the virtual card data associated with the account, and download the virtual card data while the server is accessed using the account.

17. The terminal according to claim 13, wherein the program includes further instructions to establish a universal serial bus (USB) connection between the terminal and the intermediate device.

18. The terminal according to claim 13, wherein:

the terminal further comprises a universal serial bus (USB) interface; and the instructions to report the terminal information to the server, access the server, and download the virtual card data include instructions to report the terminal information to the server, access the server, and download the virtual card data through the USB interface.

\* \* \* \* \*